United States Patent
Li et al.

(10) Patent No.: US 12,449,588 B2
(45) Date of Patent: Oct. 21, 2025

(54) MULTICORE FIBER STUBS, MULTICORE FAN-IN, FAN-OUT DEVICES, AND METHODS OF FABRICATING THE SAME

(71) Applicant: Corning Research & Development Corporation, Corning, NY (US)

(72) Inventors: Ming-Jun Li, Horseheads, NY (US); Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 202 days.

(21) Appl. No.: 17/974,080

(22) Filed: Oct. 26, 2022

(65) Prior Publication Data

US 2023/0138454 A1  May 4, 2023

Related U.S. Application Data

(60) Provisional application No. 63/273,413, filed on Oct. 29, 2021.

(51) Int. Cl.
*G02B 6/02* (2006.01)
*G02B 6/26* (2006.01)

(52) U.S. Cl.
CPC ......... *G02B 6/02042* (2013.01); *G02B 6/262* (2013.01)

(58) Field of Classification Search
CPC .............................. G02B 6/02042; G02B 6/262
See application file for complete search history.

(56) References Cited

U.S. PATENT DOCUMENTS 9,069,118 B2 * 6/2015 Matsuo .............. G02B 6/02042
2020/0192040 A1 6/2020 Li et al.

FOREIGN PATENT DOCUMENTS

AU   2020100756 A4   6/2020

OTHER PUBLICATIONS

Kopp, V., et al., "Pitch reducing optical fiber array and multicore fiber for space-division multiplexing", IEEE Photonics Society Summer Topical Meeting Series, 2013, pp. 99-100, 2013.
Matsui, H., et al., "Applicability of the Mosquito method to fabricate fan-in/out device for single-mode multicore fiber", 2019 IEEE CPMT Symposium Japan (ICSJ), 2019, pp. 63-66.

(Continued)

*Primary Examiner* — John Bedtelyon
(74) *Attorney, Agent, or Firm* — Michael E. Carroll, Jr.

(57) ABSTRACT

In one embodiment, a multicore optical fiber stub includes a plurality of optical cores, each optical core having an inner core and an outer core, and a fiber coupling section having a first diameter. The plurality of optical cores has a first pitch at the fiber coupling section. Each core at the fiber coupling section has a first index profile. The multicore optical fiber stub also includes a multicore fiber coupling section having a second diameter less than the first diameter. The plurality of optical cores has a second pitch at the multicore fiber coupling section that is less than the first pitch. Each core at the multicore fiber coupling section has a second index profile. The multicore optical fiber stub further includes a taper section between the first pitch at the fiber coupling section and the second pitch at the multicore fiber coupling section. The taper section has a taper ratio of less than 4.

19 Claims, 11 Drawing Sheets

(56) References Cited

OTHER PUBLICATIONS

Psaila, N., "3D laser direct writing for advanced photonic integration", Proceedings of the SPIE, vol. 10924, 2019, 9 pages.

Shikama, K., et al., "Multicore-fiber receptacle with compact fan-in/fan-out device for SDM transceiver applications," J. Lightw. Technol., vol. 36, No. 24, Dec. 15, 2018, pp. 5815-5822.

Shimakawa, O., et al., "Physical-contact conditions between multi-core fiber and fiber bundle fan-out connectors", 2015 Opto-Electronics and Communications Conference (OECC). Proceedings, 2015, pp. 1-3.

Thomson, R.R., et al., "Ultrafast-laser inscription of a three dimensional fan-out device for multicore fiber coupling applications", Optics Express, vol. 15, No. 18, Sep. 3, 2007, pp. 11691-11697.

Watanabe, K., et al., "Development of fiber bundle type fan-out for multicore fiber", 2012 Opto-Electronics and Communications Conference (OECC), pp. 475-476, 2012.

\* cited by examiner

MULTICORE FIBER STUBS, MULTICORE FAN-IN, FAN-OUT DEVICES, AND METHODS OF FABRICATING THE SAME

CROSS-REFERENCE TO RELATED APPLICATIONS

This application claims the benefit of priority of U.S. Provisional Application Ser. No. 63/273,413 filed on Oct. 29, 2021, the content of which is relied upon and incorporated herein by reference in its entirety.

FIELD

The disclosure is directed to fan-in, fan-out devices and, more particularly, to multicore fiber stubs, multicore fan-in, fan-out devices, and methods of fabricating the same.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

Multicore fibers (MCF) have been intensively studied in the last two decades as one of the ways to improve the transmission capacity of optical fibers. Application of MCF for long haul applications was slow in part because of the rapid advances of transmission rate in coherence communications as well as the high cost associated with laying out new long haul cables. However, the rapid growth of hyper-scale datacenters opens a new opportunity of MCF. Although the distance within a datacenter campus is typically less than 2 km, a massive number of fibers is used to interconnect the buildings or regional campuses. At the same time, the high-fiber count cables are deployed through existing ducts, which have limited space. As the need for fiber count continues to increase, MCF provides a much needed relieve in duct space.

One component in a MCF-based fiber link is the fan-in fan-out (FI/FO) device, which breaks out each optical core in a MCF to separate single-core optical fibers. The device operates by routing the optical cores with a small pitch from the MCF and converting the small pitch into a wider pitch for connectivity to standard single-core optical fibers (e.g., 125 µm optical fibers).

Present fan-in fan-out have several disadvantages, including high insertion loss and also expensive and complicated manufacturing requirements. Consequently, there exists an unresolved need for fan-in fan-out devices having low insertion loss that also lends themselves to high volume production and automation.

SUMMARY

Various embodiments of multicore fiber stubs and multicore fan-in, fan-fan out devices having short lengths and small taper ratios. The multicore fiber stubs and multicore fan-in, fan-fan out devices disclosed herein are also easily manufacturable and provide low insertion loss.

In one embodiment, a multicore optical fiber stub includes a plurality of optical cores, each optical core having an inner core and an outer core, and a fiber coupling section having a first diameter. The plurality of optical cores has a first pitch at the fiber coupling section, and each core at the fiber coupling section has a first index profile with three regions. The multicore optical fiber stub also includes a multicore fiber coupling section having a second diameter that is less than the first diameter. The plurality of optical cores has a second pitch at the multicore fiber coupling section that is less than the first pitch, and each core at the multicore fiber coupling section has a second index profile with three regions. The multicore optical fiber stub further includes a taper section between the fiber coupling section and the multicore fiber coupling section. The taper section has a decreasing diameter such that the taper section has a taper ratio of the first pitch to the second pitch being less than 4.

In another embodiment, a multicore optical fiber fan-in, fan-out device includes a multicore optical fiber stub, a plurality of single core optical fibers, and a multicore optical fiber. The multicore optical fiber stub includes a plurality of optical cores, each optical core having an inner core and an outer core, and a fiber coupling section having a first diameter. The plurality of optical cores has a first pitch at the fiber coupling section, and each core at the fiber coupling section has a first index profile with three regions. The multicore optical fiber stub also includes a multicore fiber coupling section having a second diameter that is less than the first diameter. The plurality of optical cores has a second pitch at the multicore fiber coupling section that is less than the first pitch, and each core at the multicore fiber coupling section has a second index profile with three regions. The multicore optical fiber stub further includes a taper section between the fiber coupling section and the multicore fiber coupling section. The taper section has a decreasing diameter such that the taper section has a taper ratio of the first pitch to the second pitch being less than 4. The plurality of single-core optical fibers is optically coupled to the plurality of optical cores at a fiber coupling face of the fiber coupling section. The multicore optical fiber includes a plurality of optical cores optically coupled the plurality of optical cores of the multicore optical fiber stub at a multicore coupling face of the multicore fiber coupling section.

In yet another embodiment, a method of fabricating an optical interconnect device includes applying heat to a multicore optical fiber to taper the multicore optical fiber from a first diameter to a second diameter less than the first diameter over a taper section having a taper length. The multicore optical fiber includes a plurality of optical cores, each optical core having an inner core and an outer core. The taper section has a taper ratio of a first pitch at the fiber coupling section to the second pitch at the multifiber coupling section being less than or equal to 4. The method further includes cutting the multicore optical fiber to form a multicore optical fiber stub. The multicore optical fiber stub includes a fiber coupling section having the first diameter, a multicore fiber coupling section having the second diameter, and a taper section. The plurality of optical cores has a first pitch at the fiber coupling section, and each core at the fiber coupling section has a first index profile with three regions. The plurality of optical cores has a second pitch at the multicore fiber coupling section that is less than the first pitch, and each core at the multicore fiber coupling section has a second index profile with three regions. The taper section is located between the fiber coupling section and the multicore fiber coupling section.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

References will now be made in detail to the embodiments of the disclosure, examples of which are illustrated in the accompanying drawings. Whenever possible, like reference numbers will be used to refer to like components or parts.

The concepts disclosed are related to low-cost fan-in fan-out devices for multicore fiber (MCF) applications with low insertion loss as well as their manufacture. Previous fan-in, fan-out devices for solutions have been based on three types of technologies. The first technology is based on a reduced cladding fiber bundle. The reduced cladding fiber bundle is obtained through precisely etching the cladding to a diameter equal to half the core spacing of the MCF and stacking the fibers in a capillary or a ferrule. This is a highly delicate process and flaws may be generated that affects the long term reliability.

The second technology for fan-in fan-out devices is waveguide-based devices. With laser inscribed waveguides in glass, pitch conversion and transition from two dimensions to one dimension becomes feasible. The glass waveguide chip is then connected to fibers and a MCF using an active alignment process. However, waveguide-based fan-in fan-out devices are limited by insertion loss performance due to the waveguide propagation loss and the coupling loss.

The third technology is fiber-based devices. In this approach, the fan-out fibers are spaced at a proper spacing and placed inside a low index glass preform and tapered to very small diameter, where the fiber claddings become the "cores" and the low index tubing becomes the cladding. The taped end is fusion spliced to a MCF. This method produces lower insertion loss; however, the process is complicated and lacks scalability. Moreover, a more than 10× taper ratio is required to shrink the fiber cladding into the "core." Although the taper ratio can be reduced by using relay fibers with a second cladding, the need for a precision glass preform remains to hamper automation.

The multicore optical fiber fan-in, fan-out devices of the present disclosure are highly manufacturable, have low insertion loss, and a small taper ratio for the multicore optical fiber stub (e.g., less than or equal to 4 for the ratio of a first pitch at the fiber coupling section to a smaller second pitch at the multicore coupling section). Various embodiments of multicore fiber stubs, multicore optical fiber fan-in, fan-out devices, and methods of fabricating an optical interconnect device are described in detail below.

Figure 1:
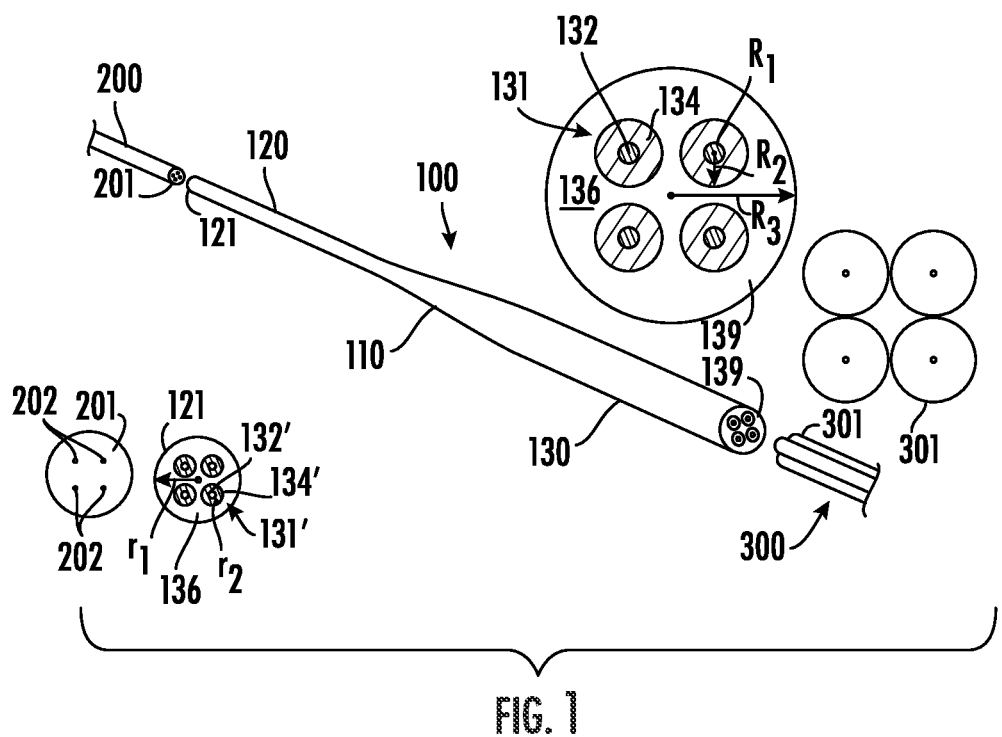
FIG. 1 schematically illustrates an example multicore optical fiber stub, an example multicore optical fiber, and an example bundle of single-core optical fibers according to one or more embodiments described and illustrated herein.

Referring now to FIG. 1, an example multicore optical fiber stub 100 (MCF stub 100) along with a MCF 200 and a bundle of single-core optical fibers 300 are illustrated. The MCF stub 100 is operable to optically couple the optical cores 202 of the MCF 200 to the individual optical cores (not shown) of each optical fiber of the plurality of single-core optical fibers 300. The phrase "optically coupled" means that an optical signal passes between an interface with less than 1 dB optical loss.

Generally, the MCF stub 100 is the component that converts a fiber pitch from that of a bundled single-core optical fiber 300 to a core pitch matched to that of the MCF 200. The profile of the fiber cores in the MCF stub 100 is such that the mode field diameter of the cores stays consistent at the tapered and un-tapered ends. FIG. 1 illustrates a 2×2, four core MCF stub 100 as an example. It should be understood that devices for other MCF configurations and core numbers can be designed following the same approach of the embodiments described in the present disclosure.

The example MCF stub 100 comprises three sections: a fiber coupling section 130 which is operable to be coupled to the bundled single-core optical fibers 300; a taper section 110, and a multicore fiber coupling section 120 operable to be coupled to the MCF 200.

Within the fiber coupling section 130, the MCF stub has four cores 131 (i.e., core regions) defined by an inner core 132 and an outer core 134. The cores 131 are surrounded by a low index cladding 136. The cores 131 are exposed at a fiber coupling face 139 of the fiber coupling section 130.

The pitch and diameter of the cores 131' are reduced within the multicore fiber coupling section 120. As shown in FIG. 1, the multicore fiber coupling section 120 has an inner core 132', and outer core 134' and the low index cladding 136' that has a reduced diameter as compared to the low index cladding 136 at the fiber coupling section 130. The reduced-diameter cores 131' are exposed at a multicore fiber coupling face 121.

The lengths of the fiber coupling section 130 and the multicore fiber coupling section 120 are not limited by this disclosure; however, they each may be at least 5 mm long for handling in a subsequent fusion splicing process. The length of taper section 110 may be such to allow loss-less adiabatic transition of the mode in the inner cores into the new composite core 131' formed by the tapered inner and outer cores. As non-limiting examples, the length of the taper section 100 may be at least 500 µm to ensure low transition loss. The length of the taper section may be greater than 600 µm, greater than 800 µm, greater than 1 mm, greater than 2 mm, or greater than 5 mm. The transition loss may be less than 1 dB, less than 0.5 dB, or less than 0.1 dB.

In one non-limiting example, the MCF 200 has four cores in a 2×2 array with a core-to-core pitch of 45 µm, and the bundled single-core optical fibers 300 each have a diameter of about 125 µm. In this example, the taper ratio of the taper section 110 is 2.78:1, which is substantially smaller than that of existing vanishing core technology. In embodiments of the present disclosure, the taper ratio of the taper section 110 is less than 5, less than 4, less than 3.5, or less than 3. The outer diameter of the fiber coupling section 130 of the MCF stub 100 is about 347.5 µm. With such a small diameter, the MCF stub 100 can be made continuously in long lengths using a fiber draw process with an applied protective coating. As described in more detail below, the optical fiber from which the MCF stub 100 is fabricated may be stored in reels until more MCF stubs 100 are needed to be made.

Figure 2:
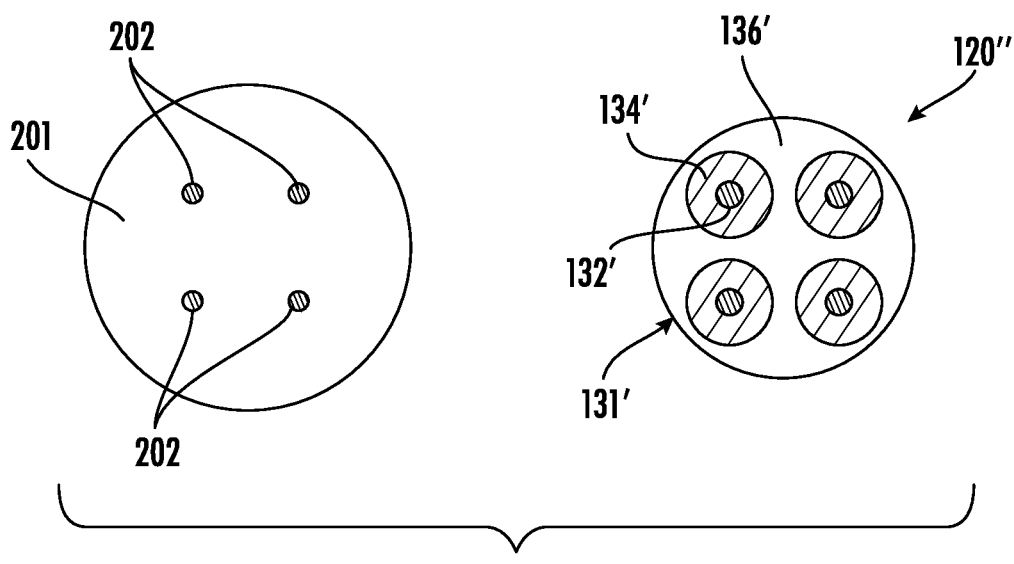
FIG. 2 schematically illustrates an example coupling face of a multicore optical fiber and an example multicore fiber coupling face of an example multicore optical fiber stub according to one or more embodiments described and illustrated herein.

In another non-limiting example, the outer diameter fiber coupling section 130 of the MCF stub 100 is matched to the peripheral diameter of the bundle of single-core optical fibers 300. For the 2×2 core MCF 200 and the 125 µm diameter single core fibers example, the outer diameter of the MCF stub 100 is designed to be about 301.8 µm. The diameter of the multicore fiber coupling section 120' is about 101.4 µm, as shown in FIG. 2, as compared to 125 µm in the example of FIG. 1. A marker (not shown) can be built in the MCF stub 100 for core identification as known in the art. The difference in outer diameter of the multicore fiber coupling section does not affect the insertion loss when spliced to the MCF fiber 200.

The MCF stubs 100 disclosed herein have index profiles with at least three regions comprising different indexes of refraction. Particularly, the fiber coupling section 130 has a first index profile with at least three regions comprising different indexes of refraction, and the multicore fiber coupling section 120 has a second index profile with at least three regions comprising different indexes of refraction. There are two different profiles because of the change in core-to-core pitch due to the taper section 120 and the changing diameter of the MCF stub 100.

Figure 3A:
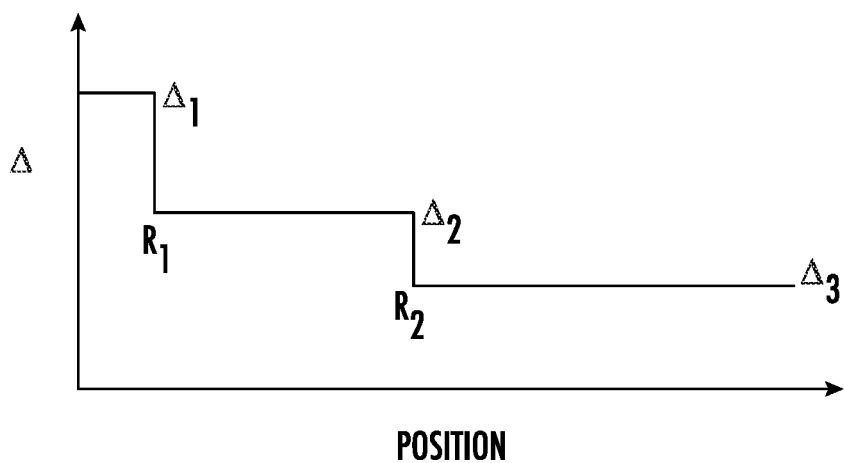
FIG. 3A illustrates an example first index profile of a fiber coupling section of an example multicore optical fiber stub according to one or more embodiments described and illustrated herein.

FIG. 3A illustrates an example first index profile of the fiber coupling section 130 of the MCF stub 100. The first index profile comprises three segments: an inner core segment provided by the inner core 132, an outer core segment provided by the outer core 134, and a cladding segment provided by the cladding 136. The inner core segment has a relative refractive index of $\Delta_1$ and a core radius of $R_1$ from the center of the inner core 132. The outer core segment has a relative refractive index of $\Delta_2$, and a core radius of $R_2$ from the center of the inner core 132. The cores are within the common low-index cladding 136 that has a relative refractive index of $\Delta_3$, and a radius of $R_c$ from the fiber center. The diameter of the fiber coupling section 130 is $D=2R_c$. The relative index profile satisfies $\Delta_1>\Delta_2>\Delta_3$.

Figure 3B:
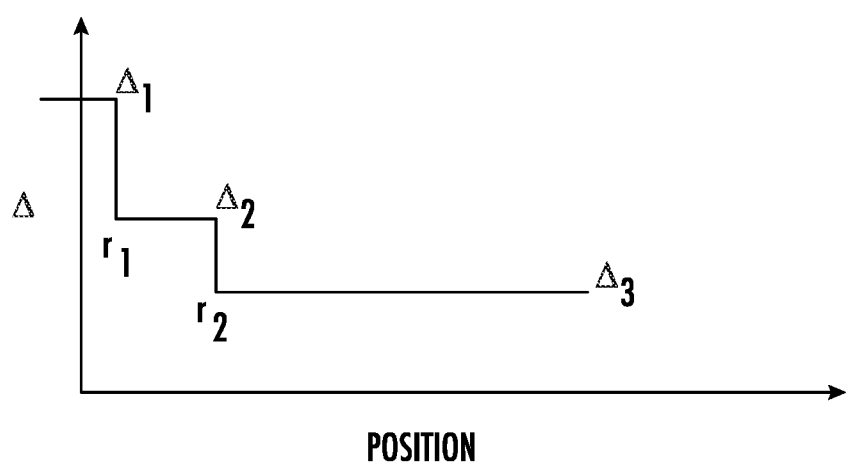
FIG. 3B illustrates an example second index profile of a multicore fiber coupling section of an example multicore optical fiber stub according to one or more embodiments described and illustrated herein.
Figure 4A:
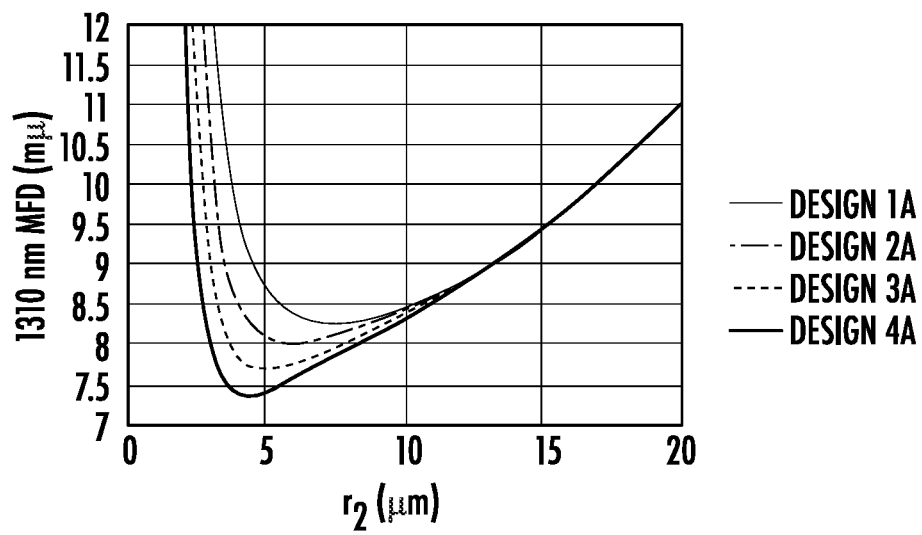
FIGS. 4A-4D are graphs that plot mode field diameter (MFD) changes as a function of outer core radius $r_2$ after tapering at 1310 nm for fiber designs according to one or more embodiments described and illustrated herein.
Figure 4B:
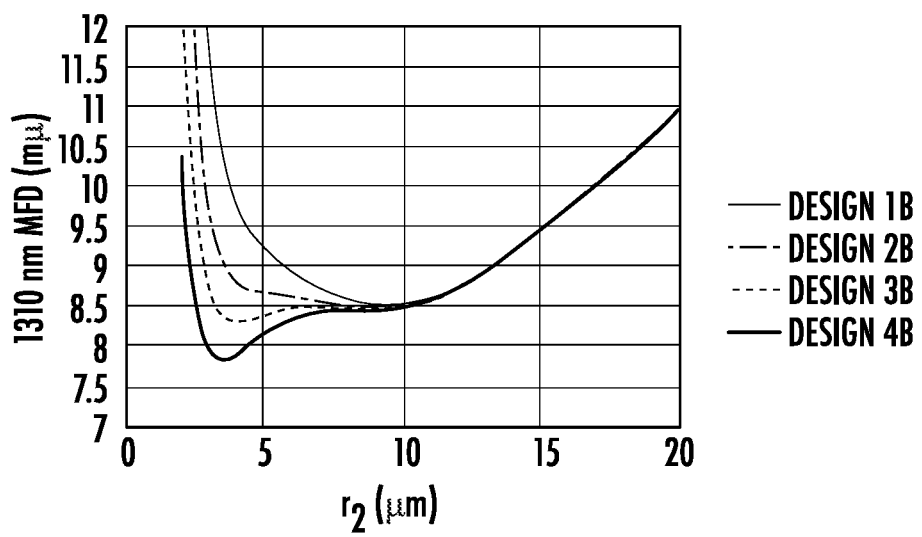
Figure 4C:
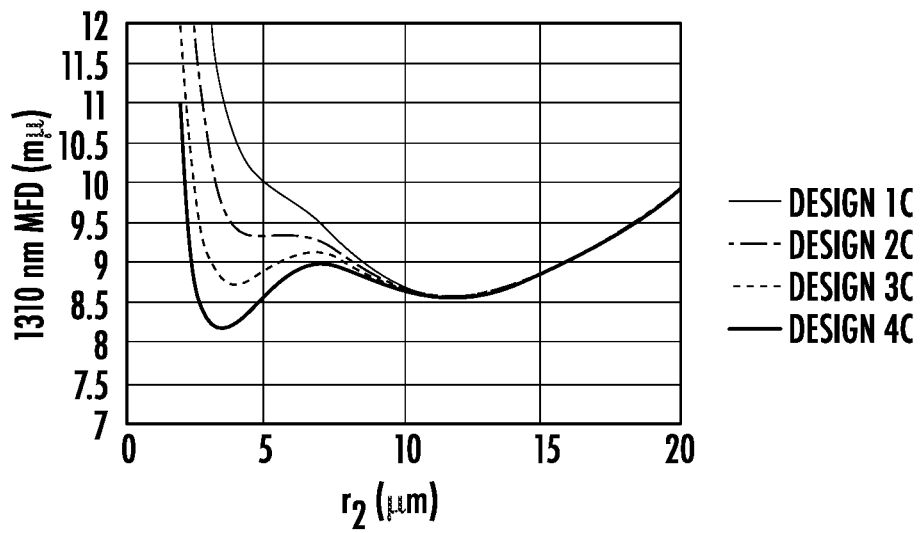
Figure 4D:
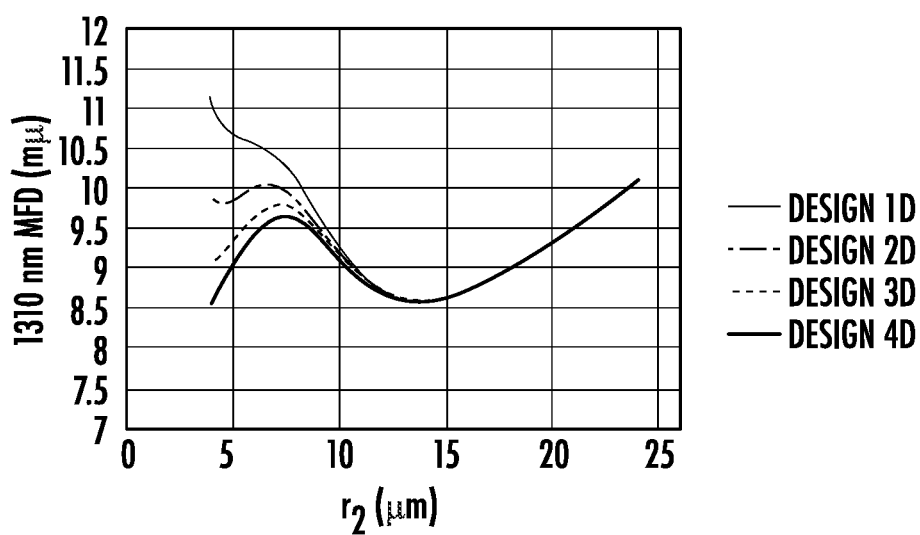
Figure 5A:
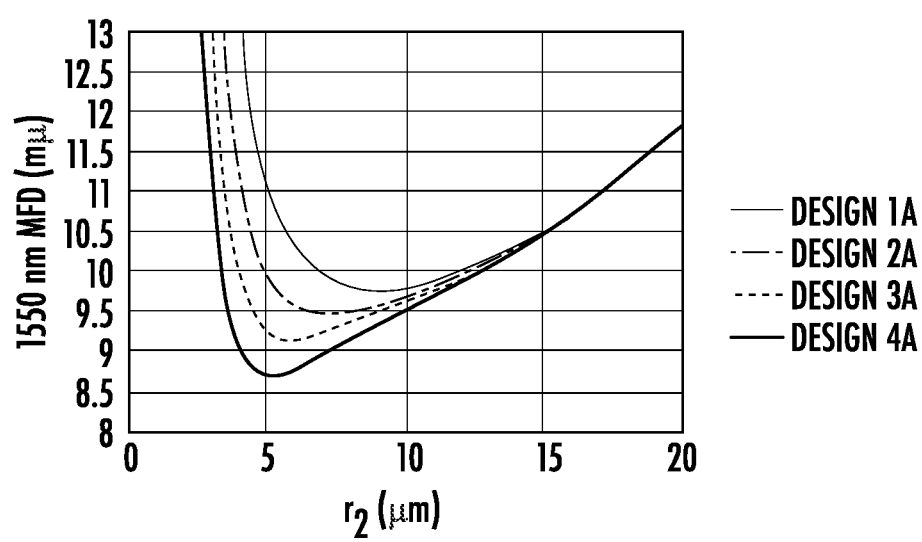
FIGS. 5A-5D are graphs that plot mode field diameter (MFD) changes as a function of outer core radius $r_2$ after tapering at 1550 nm for fiber designs according to one or more embodiments described and illustrated herein.
Figure 5B:
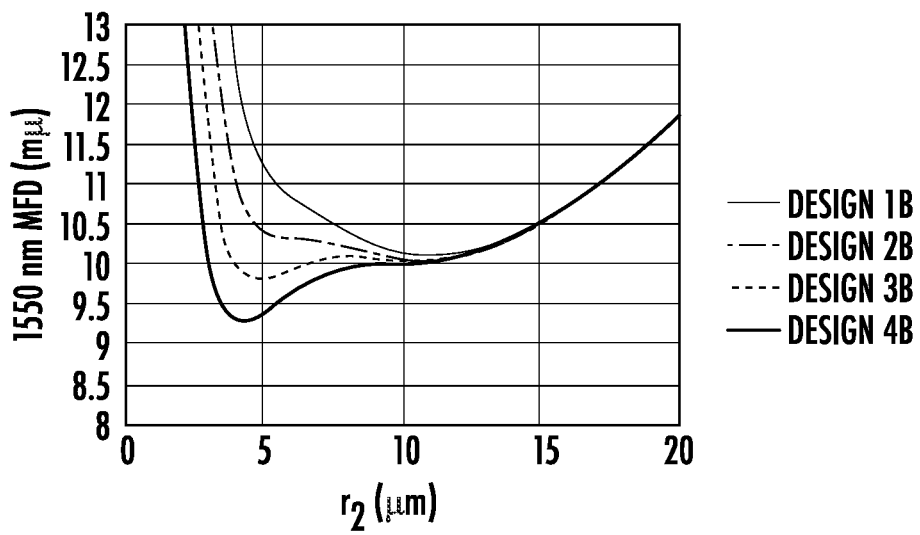
Figure 5C:
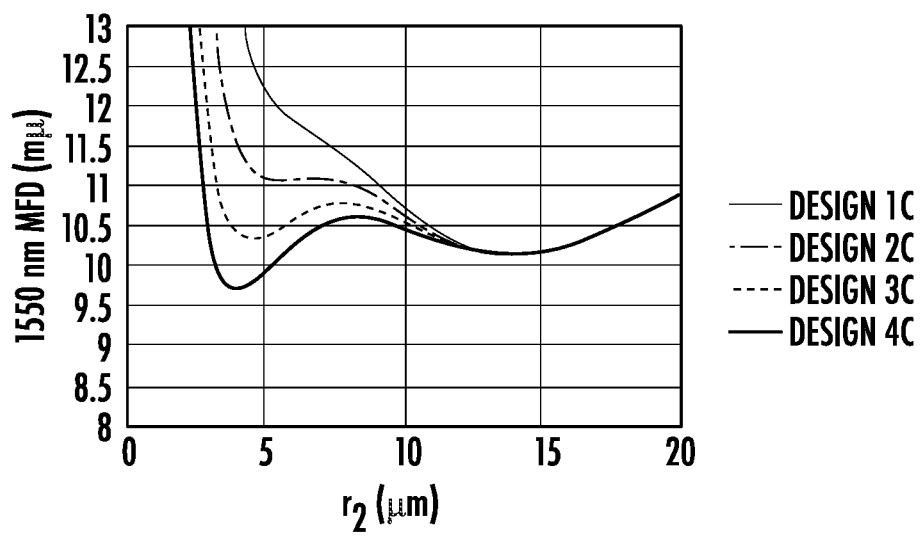
Figure 5D:
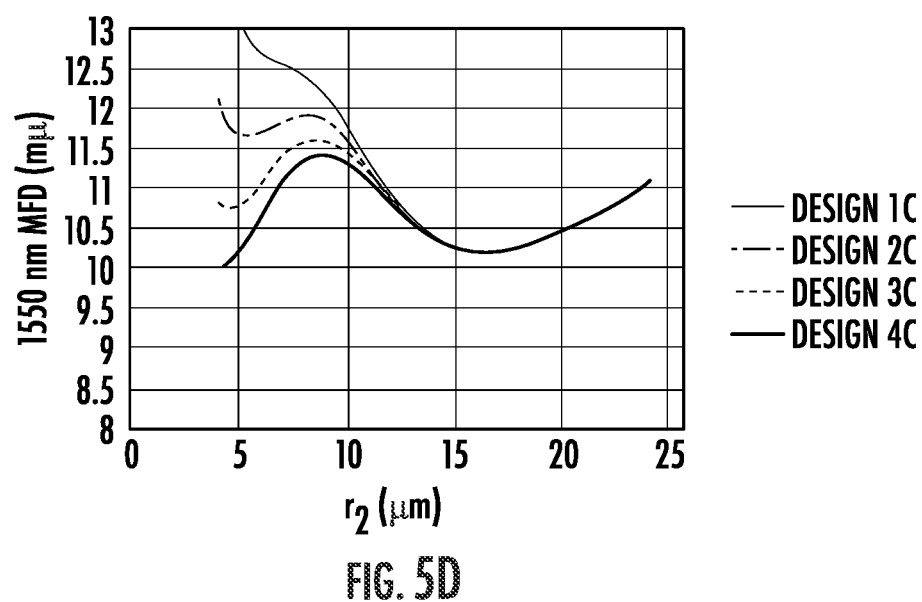

FIG. 3B illustrates an example second index profile of the multicore fiber coupling section 120 after tapering provided by the taper section 110. After tapering, the cladding diameter is reduced from $R_c$ to $r_c$. The relative refractive indices of the inner core $\Delta_1$, the outer core $\Delta_2$ and the cladding $\Delta_3$ remain the same, but the inner and outer radii are reduced to $r_1$ (not shown) and $r_2$. The diameter is reduced from D to $d=2r_c$ at the multicore fiber coupling section 120. The ratio of $R_1/r_1=R_2/r_2=R_c/r_c$ is the taper ratio. Although the profiles in FIG. 3A and FIG. 3B are ideal profiles with perfect step changes from each segment, it will be appreciated by those skilled in the art that dopant diffusions can happen during the manufacturing processes that make the profile transition rounded around the step changes without affecting the functionality of the fiber. Also, the profile can be designed with graded refractive index profiles, such as an alpha profile known in the art to have different shape to achieve similar functionally of the fiber.

Sixteen experimental MCF stubs were designed having different taper ratios and different profile designs. The design parameters are shown in Tables 1A and 1B below. In these examples, the outer core was chosen to be pure silica glass with a relative refractive index $\Delta_2=0$. The inner core has a positive relative refractive index $\Delta_1>0$, which can be made with an up-dopant in silica glass, for example with Germanium (Ge), Titanium (Ti), Aluminum (Al), Phosphorus (P) or Chlorine (Cl). The cladding has a negative relative refractive index $\Delta_3<0$, which can be made with a down-dopant, for example, Fluorine (F), or Boron (B). The fiber can also be designed by choosing the cladding to be the pure silica with $\Delta_2=0$. In this case, both the relative refractive index of both the inner and outer cores are shifted higher. The relative A differences between the inner core and the outer core, and between the outer core and the cladding remain about the same.

TABLE 1A

| Design | 1a | 1b | 1c | 1d | 2a | 2b | 2c | 2d |
|---|---|---|---|---|---|---|---|---|
| $\Delta_1$ | 0.34 | 0.34 | 0.34 | 0.34 | 0.34 | 0.34 | 0.34 | 0.34 |
| $\Delta_2$ | 0 | 0 | 0 | 0 | 0 | 0 | 0 | 0 |
| $\Delta_3$ | −0.15 | −0.15 | −0.15 | −0.15 | −0.20 | −0.20 | −0.20 | −0.2 |
| $R_2/R_1 = r_2/r_1$ | 0.413 | 0.330 | 0.275 | 0.236 | 0.413 | 0.330 | 0.275 | 0.236 |

TABLE 1B

| Design | 3a | 3b | 3c | 3d | 4a | 4b | 4c | 4d |
|---|---|---|---|---|---|---|---|---|
| $\Delta_1$ | 0.34 | 0.34 | 0.34 | 0.34 | 0.34 | 0.34 | 0.34 | 0.34 |
| $\Delta_2$ | 0 | 0 | 0 | 0 | 0 | 0 | 0 | 0 |
| $\Delta_3$ | −0.25 | −0.25 | −0.25 | −0.25 | −0.30 | −0.30 | −0.30 | −0.30 |
| $R_2/R_1 = r_2/r_1$ | 0.413 | 0.330 | 0.275 | 0.236 | 0.413 | 0.330 | 0.275 | 0.236 |

FIGS. 4A-4D plot the mode field diameter (MFD) changes as a function of outer core radius $r_2$ after tapering at 1310 nm for each of the sixteen experimental designs. Similarly, FIGS. 5A-5D plot the mode field diameter (MFD) changes as a function of outer core radius $r_2$ after tapering at 1550 nm for each of the sixteen experimental designs. From the plots of FIGS. 4A-4D and 5A-5D, one can choose the larger core radius before tapering and the small radius after tapering to have an MCF stub 100 with a MFD that matches the MFD of the multicore optical fiber 200 and the MFD of the single-core optical fibers 300. To obtain low insertion losses between the multicore optical fiber 200 and the single-core optical fibers 300, preferably the MFD mismatch at both ends of the MCF stub 100 is less than 1 µm, less than 0.5 µm, or less than 0.25 µm. A typical MFD range is between 8 µm and 11 µm at 1310 nm, and between 9 µm and 12 µm at 1550. A taper ratio between 2 and 4 may be utilized to match the mode field diameters at both ends of the MCF stub 100.

In addition to the sixteen designs of MCF stubs identified by Tables 1A and 1B, five multicore optical fiber fan-in, fan-out devices 10 (e.g., see FIG. 9) comprising a MCF stub 100 optically coupled to a MCF 200 and a bundle of single-core optical fibers 300 disposed within a housing 150 were designed. The parameters of the five multicore optical fiber fan-in, fan-out devices are provided in Table 2 below.

TABLE 2

| | | Ex. 1 | Ex. 2 | Ex. 3 | Ex. 4 | Ex. 5 |
|---|---|---|---|---|---|---|
| | Core design | 2 × 2 | 2 × 2 | 2 × 2 | 1 × 4 | 7 cores |
| | Profile design | 1b | 3c | 4d | 1a | 4b |
| Large end | Core spacing S (µm) | 125 | 80 | 160 | 80 | 125 |
| | Inner core radius $R_1$ (µm) | 4.62 | 2.06 | 4.27 | 5.82 | 3.96 |
| | Outer core radius $R_2$ (µm) | 14 | 7.5 | 18.1 | 14.1 | 12 |
| | Fiber diameter D (µm) | 347.5 | 142.4 | 443.8 | 228.8 | 375 |
| | MFD at 1310 nm (µm) | 9.2 | 9.1 | 9.0 | 9.3 | 8.8 |
| | MFD at 1550 nm (µm) | 10.4 | 10.8 | 10.3 | 10.4 | 10.1 |
| Small end | Core spacing s (µm) | 45 | 45 | 45 | 28 | 41.7 |
| | Inner core radius $r_1$ (µm) | 1.65 | 1.16 | 1.2 | 2.1 | 1.32 |
| | Outer core radius $r_2$ (µm) | 5.03 | 4.2 | 5.1 | 5.1 | 4 |
| | Fiber diameter d (µm) | 125 | 80 | 125 | 80 | 125 |
| | MFD at 1310 nm (µm) | 8.7 | 8.8 | 9.0 | 8.6 | 7.9 |
| | MFD at 1550 nm (µm) | 10.4 | 10.4 | 10.3 | 10.9 | 9.3 |
| | Taper ratio | 2.78 | 1.78 | 3.55 | 2.86 | 3 |

As shown in Table 2, in these examples, core designs of 2×2 cores are arranged in a square around the core center, 1×4 cores arranged in a line across the center, and 7 cores with one core in the center and 6 cores arranged in a hexagonal shape. At the large end of the taper section 110, a core spacing of 125 and 80 µm can be used to adapt fiber arrays of with fiber diameter of the 125 and 80 µm. In Example 3, the core spacing is 160 µm, which can be used to attach individual single-core optical fibers without them touching one another. In all five examples, the diameter of the fiber coupling section 130 is less than 400 µm. As described in more detail below, the MCF fabrication process may be used to make such multicore fibers and wind them onto a fiber reel. Therefore, the proposed large diameter MCF can be made with long length and low costs. Because the taper ratio is less than 4, the multicore optical fiber fan-in, fan-out devices described herein are easy to make with low manufacturing costs.

Figure 6:
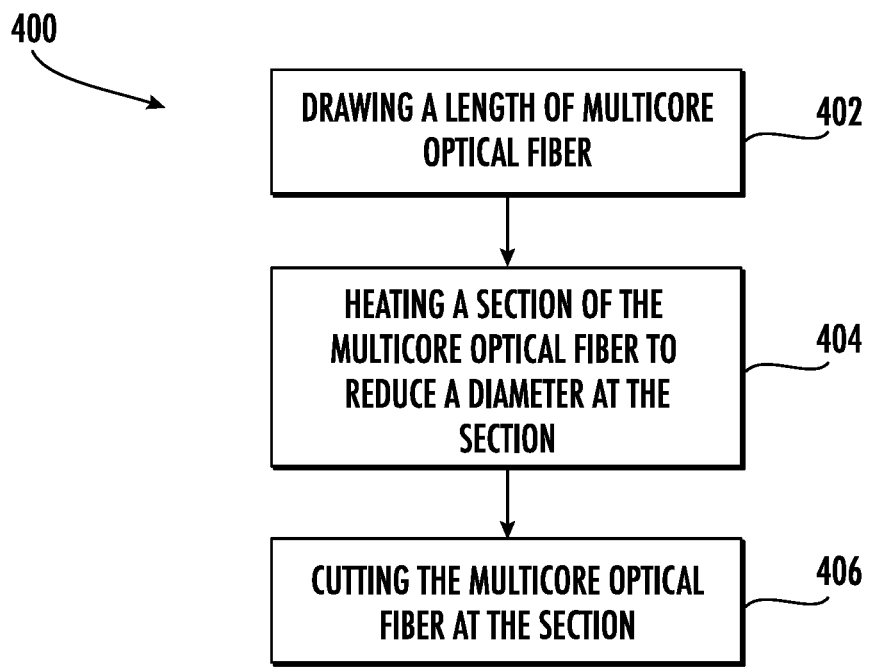
FIG. 6 is a flowchart illustrating an example process to fabricate a multicore optical fiber stub according to one or more embodiments described and illustrated herein.

FIG. 6 is a flowchart 400 illustrating an example method of fabricating a MCF stub 100. At block 402, a length of a MCF is drawn by any known or yet-to-be developed draw process. In one embodiment, a silica-based glass substrate blank and core canes are prepared first using a known fiber preform manufacturing process such outside vapor deposition (OVD), modified chemical vapor deposition (MCVD) or plasma chemical vapor deposition (PCVD). The substrate blank and core canes are made according to a refractive index profile design with appropriate dopants that described in previous sections. In some embodiments, the substrate blank has a diameter of in the range of 1 cm to 20 cm. In some embodiments, the core canes have a diameter of 1 mm to 20 mm. The substrate blank is drilled with multiple holes according to a multicore fiber structure design and the hole diameter is slightly larger than the cane diameter to enable the insertion of core canes into the holes. Then the core canes are inserted into the holes of the substrate blank and sealed by applying heat and vacuum for form a multicore preform. The multicore preform is then drawn into MCF using a fiber draw tower known in the art. The MCF may have any designed diameter and any number of optical cores in any desired core arrangement. In some embodiments, a polymeric coating layer or a dual polymeric coating including a primary coating layer and a secondary coating layer is applied to the drawn multicore optical fiber. The drawn multicore optical fiber may be wound in a reel. The fiber length may be greater than 1 m, greater than 10 m, greater than 100 m, greater than 1 km, or greater than 10 km.

Figure 7:
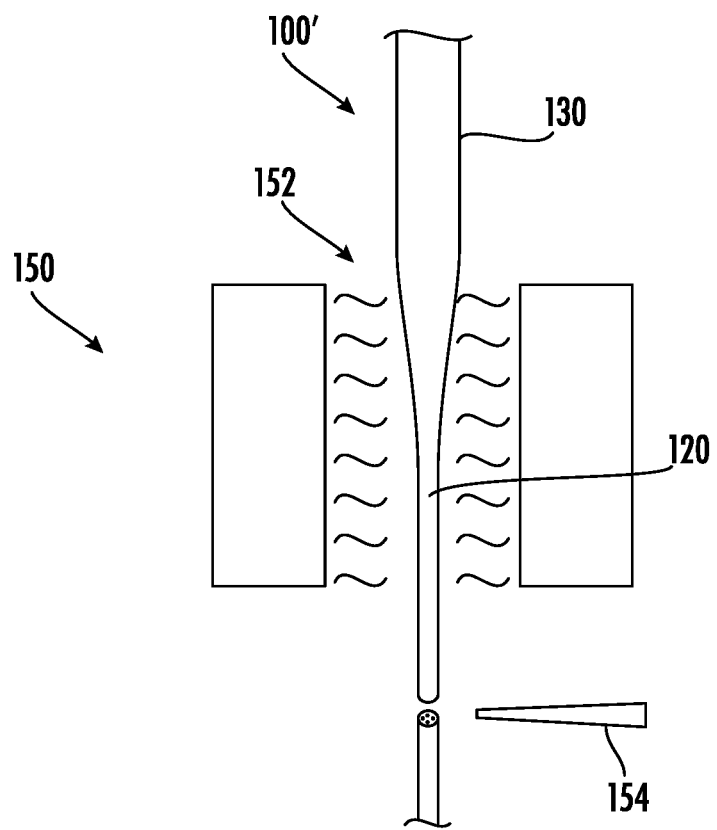
FIG. 7 schematically illustrates a tapering and cutting system for fabricating a multicore optical fiber stub according to one or more embodiments described and illustrated herein.

At block 404, a section of the MCF has its coating removed, and is heated to reduce the diameter of the MCF over a taper length. FIG. 7 illustrates an example heating process to reduce the diameter of a MCF 100'. A section of the MCF 100' is disposed within a heating device 150, which may be configured to completely enclose the portion of the MCF 100' or only partially enclose the portion of the MCF 100' (e.g., from one or more sides of the MCF 100'). The heating device 150 is operable to apply heat 152 to the MCF 100' to raise its temperature to above its softening point. As non-limiting example, the heating device 150 may be an electric arc, a resistive heater, or $CO_2$ lasers. In some embodiments, a pulling force is applied to the MCF 100' to form the taper section and reduce the diameter of the MCF 100'. In other embodiments, gravity causes the reduction in diameter of the MCF 100'. A diameter monitoring device may be used to control the diameter of the MCF 120 to get an accurate and uniform diameter.

The taper shape follows the taper profile described above. Because of the smaller diameter of the MCF 100' compared with a glass preform, the taper process is better controlled than tapering a multicore glass cane, typically around 1 to a few mm in diameter into a fiber of about 125 μm in diameter. At block 406, the tapered MCF 100' is then cleaved off based on a pre-designed length. FIG. 7 illustrates a cleaving component 154 operable to cleave the MCF 100' to form the MCF stub 100. The cleaving may be done by a $CO_2$ laser, or an ultra-fast laser in the visible or near infrared wavelength range, or a mechanical device. Thus, the tapered MCF stubs described herein are automatically produced continuously without having to load the preforms and feeding the optical fibers through the preforms, which provides for high throughput.

Figure 8:
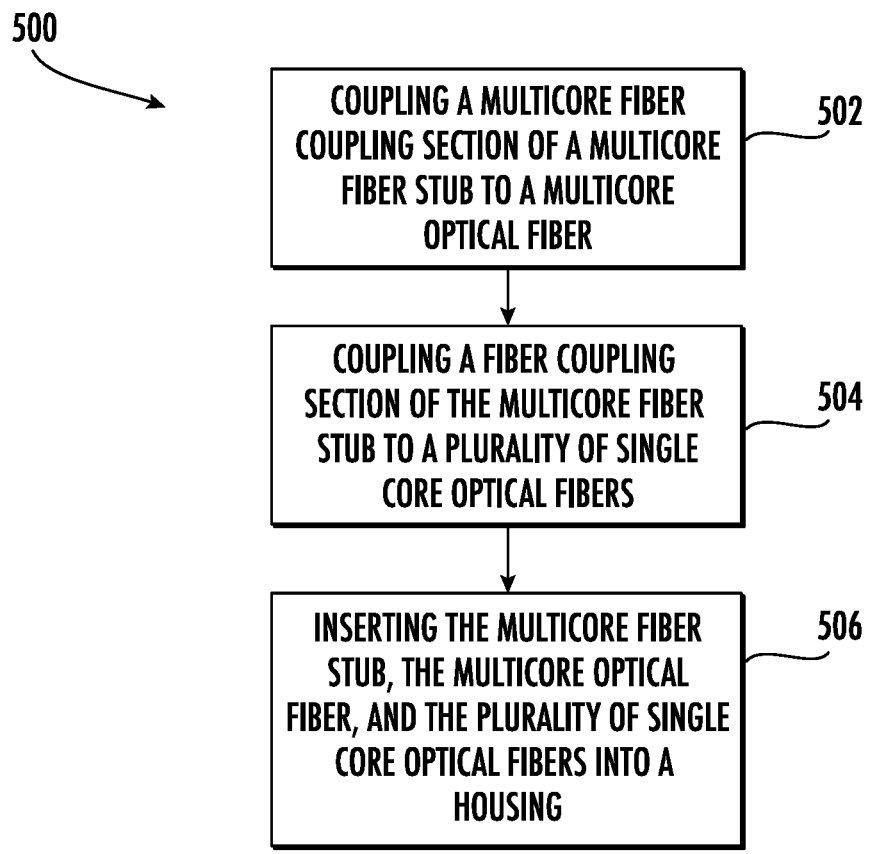
FIG. 8 is a flowchart illustrating an example process to fabricate a multicore fan-in, fan-out device according to one or more embodiments described and illustrated herein.

Referring now to FIG. 8, a flowchart 500 of an example process for fabricating a multicore fan-in, fan-out device 10 is provided. At block 502, a multicore fiber coupling section 120 of a MCF stub 100 is coupled to a MCF 200. The other end of the MCF 200 may be terminated with a MCF connector. At block 504, a fiber coupling section 130 of the MCF stub 100 is coupled to a plurality of single-core optical fibers 300. The other end of the plurality of single-core optical fibers 300 may be terminated by individual single-mode fiber connectors. In some embodiments, the coupling between the MCF stub 100 and the MCF 200 and the plurality of single-core optical fibers 300 is effectuated by fusing splicing.

The multicore fiber coupling section matches the MCF in both core pitch and mode field diameter. Very low insertion loss is obtained through fusion splicing. At the fiber coupling section, single-core optical fibers, (e.g., single-core optical fibers or single-core optical fibers with titanium doped strength layer) are stripped of coating and bundled into a 2×2 array matching the core pattern of the MCF stub 100. When a titanium doped stress layer is present, the bare optical fiber can be handled without mechanical defects. In some embodiments, the bundled single-core optical fiber 300 has a pitch of 125 μm. Alternatively, smaller cladding diameter fiber with or without titanium cladding layer can be used to further reduce the taper ratio. With a 125 μm cladding diameter, the single-core optical fibers 300 can be terminated using standard connector ferrules. Once again, because of the relatively smaller diameter of the MCF stub 100 compared with glass preforms, fusion splicing of the un-tapered end to the bundle of single-core optical fibers 300 is feasible using a similar heat source as the that used in the tapering process. In another embodiment, the single-core optical fibers 300 may be laser-fused to the fiber coupling face 139 sequentially but at a larger pitch than 125 μm. In this case, a larger core pitch in the MCF stub 100 and a higher taper ratio may be needed.

Figure 9:
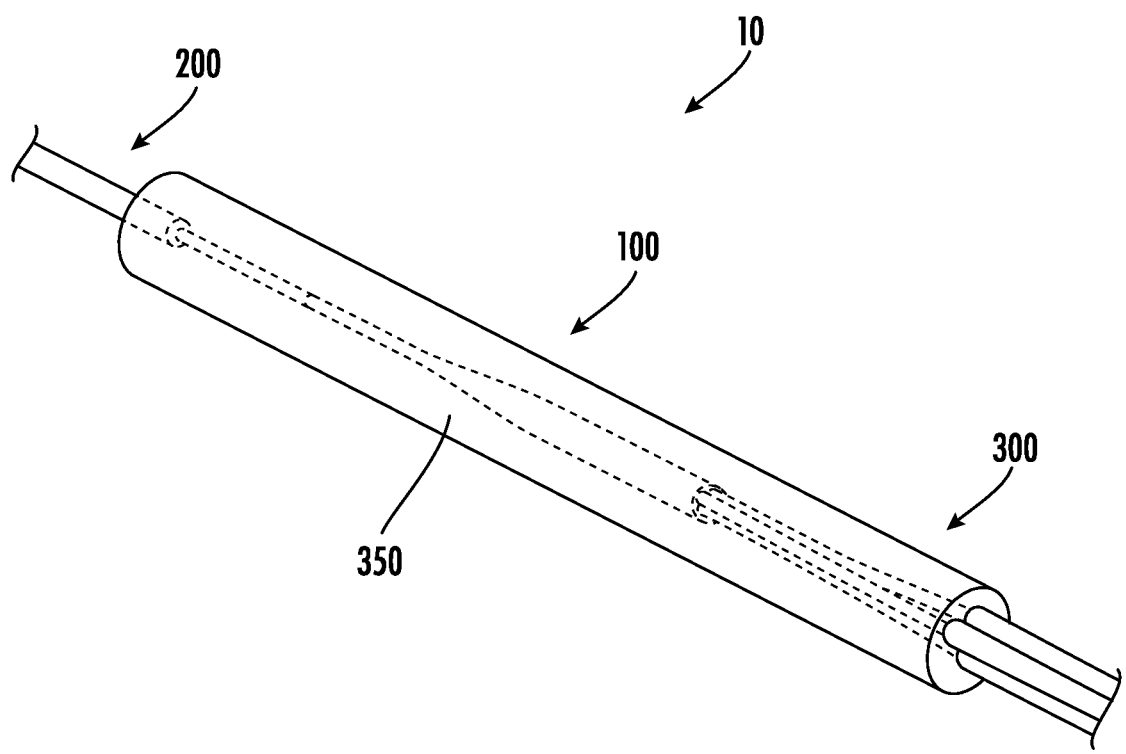
FIG. 9 schematically illustrates an example multicore fan-in, fan-out device according to one or more embodiments described and illustrated herein.

At block 506 of FIG. 8, the MCF stub 100 and a portion of the MCF 200 and a portion of the bundle of single-core optical fibers 300 into a housing 350, an example of which is shown in FIG. 9. The housing 350 may be rigid, such as fabricated from a hard polymer. In other embodiments, the housing 350 may be flexible (e.g., fabricated from a heat shrink material, such as a soft polymer). The exposed fibers are encapsulated in polymeric material.

It should now be understood that embodiments of the present disclosure are directed to MCF stubs, multicore fan-in, fan-out devices, and methods of fabricating the same. The multicore fan-in, fan-out devices described herein have smaller footprints compared with previous fan-in, fan-out devices using tapered preforms. As a non-limiting example, the cross section of the fan-in, fan-out device may be only 0.5 mm at its largest diameter. The smaller taper ratio of the devices disclosed herein translates to shorter overall length. The taper and splices may be kept straight in the package without tension.

The MCF stub 100 may be terminated with two connector interfaces. The connector interface at the coupling section 120 is to connect with the MCF 200 terminated with a multicore connector. The connector interface at the coupling section 130 is to connect with fiber bundle terminated with a multi-fiber connector. In this configuration, a compact fan-in or fan-out connector can be realized with the MCF stub 100.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A multicore optical fiber stub comprising:
    a plurality of optical cores, each optical core having an inner core and an outer core;
    a fiber coupling section having a first diameter, wherein the plurality of optical cores has a first pitch at the fiber coupling section, and each core at the fiber coupling section has a first index profile with three regions comprising different indexes of refraction;
    a multicore fiber coupling section having a second diameter that is less than the first diameter, wherein the plurality of optical cores has a second pitch at the multicore fiber coupling section that is less than the first pitch, and each core at the multicore fiber coupling section has a second index profile with three regions comprising different indexes of refraction; and a taper section between the fiber coupling section and the multicore fiber coupling section, the taper section having a decreasing diameter such that the taper section has a taper ratio of the first pitch to the second pitch being less than 4, and wherein the taper section provides an adiabatic taper for the plurality of optical cores.

2. The multicore optical fiber stub of claim 1, wherein:
an inner core index region of the first index profile is shorter in length than an inner core index region of the second index profile; and
an outer core index region of the second index profile is shorter in length than an outer core index region of the second index profile.

3. The multicore optical fiber stub of claim 1, wherein a diameter of the fiber coupling section is less than or equal to 400 μm.

4. The multicore optical fiber stub of claim 1, wherein a length of the taper section is less than 10 mm.

5. The multicore optical fiber stub of claim 1, wherein a mode field diameter of each core of the plurality of optical cores at the fiber coupling section is within 1 μm of a mode field diameter of each core of the plurality of optical cores at the multicore fiber coupling section.

6. A multicore optical fiber fan-in, fan-out device comprising:
a multicore optical fiber stub comprising:
a plurality of optical cores, each optical core having an inner core and an outer core;
a fiber coupling section having a first diameter, wherein the plurality of optical cores has a first pitch at the fiber coupling section, and each core at the fiber coupling section has a first index profile with three regions comprising different indexes of refraction;
a multicore fiber coupling section having a second diameter that is less than the first diameter, wherein the plurality of optical cores has a second pitch at the multicore fiber coupling section that is less than the first pitch, and each core at the multicore fiber coupling section has a second index profile with three regions comprising different indexes of refraction; and
a taper section between the fiber coupling section and the multicore fiber coupling section, the taper section having a decreasing diameter such that the taper section has a taper ratio of the first pitch to the second pitch being less than 4;
a plurality of single-core optical fibers optically coupled to the plurality of optical cores at a fiber coupling face of the fiber coupling section, wherein each single-core optical fiber of the plurality of single-core optical fibers comprises:
an inner core;
an outer cladding; and
a titanium doped stress layer in the outer cladding, wherein the outer cladding of each single-core optical fiber is in contact with the outer claddings of adjacent single core optical fibers to form a geometry consistent with the multicore optical fiber; and
a multicore optical fiber comprising a plurality of optical cores optically coupled the plurality of optical cores of the multicore optical fiber stub at a multicore coupling face of the multicore fiber coupling section.

7. The multicore optical fiber fan-in, fan-out device of claim 6, wherein:
an inner core index region of the first index profile is shorter in length than an inner core index region of the second index profile; and
an outer core index region of the second index profile is shorter in length than an outer core index region of the second index profile.

8. The multicore optical fiber fan-in, fan-out device of claim 6, wherein a diameter of the fiber coupling section is less than or equal to 400 μm.

9. The multicore optical fiber fan-in, fan-out device of claim 6, wherein a length of the taper section is less than 10 mm.

10. The multicore optical fiber fan-in, fan-out device of claim 6, wherein the taper section provides an adiabatic taper for the plurality of optical cores.

11. The multicore optical fiber fan-in, fan-out device of claim 6, wherein a mode field diameter of each core of the plurality of optical cores at the fiber coupling section is within 1 μm of a mode field diameter of each core of the plurality of optical cores at the multicore fiber coupling section.

12. The multicore optical fiber fan-in, fan-out device of claim 6, wherein:
the plurality of single-core optical fibers is spliced to the fiber coupling face of the multicore optical fiber stub; and
the multicore optical fiber is spliced to the multicore coupling face of the multicore optical fiber stub.

13. The multicore optical fiber fan-in, fan-out device of claim 6, wherein each single-core optical fiber has an outer cladding diameter of within a range of 80 μm to 125 μm, including end points.

14. A method of fabricating an optical interconnect device, the method comprising:
a multicore optical fiber formed by a draw process;
applying heat to the multicore optical fiber to taper the multicore optical fiber from a first diameter to a second diameter less than the first diameter over a taper section having a taper length, wherein:
the multicore optical fiber comprises a plurality of optical cores, each optical core having an inner core and an outer core;
cutting the multicore optical fiber to form a multicore optical fiber stub comprising:
a fiber coupling section having the first diameter, wherein the plurality of optical cores has a first pitch at the fiber coupling section, and each core at the fiber coupling section has a first index profile with three regions comprising different indexes of refraction;
a multicore fiber coupling section having the second diameter, wherein the plurality of optical cores has a second pitch at the multicore fiber coupling section that is less than the first pitch, and each core at the multicore fiber coupling section has a second index profile with three regions comprising different indexes of refraction; and
the taper section between the fiber coupling section and the multicore fiber coupling section, wherein the taper section has a taper ratio of a first pitch to a second pitch being less than or equal to 4.

15. The method of claim 14, further comprising applying a polymeric coating to the multicore optical fiber.

16. The method of claim 15, further comprising winding the multicore optical fiber into a reel.

17. The method of claim 14, further comprising
splicing a plurality of single-core optical fibers to a fiber coupling face at the fiber coupling section of the multicore optical fiber stub; and
splicing a multicore optical fiber to a multicore coupling face at the multicore fiber coupling section of the multicore optical fiber stub.

18. The method of claim 17, further comprising enclosing the multicore optical fiber stub, the plurality of single-core optical fibers, and the multicore optical fiber in a housing.

19. A multicore optical fiber stub made according to the method of claim 14.

* * * * *